(12) United States Patent
Klein et al.

(10) Patent No.: US 9,282,086 B2
(45) Date of Patent: Mar. 8, 2016

(54) METHODS AND SYSTEMS FOR SECURED AUTHENTICATION OF APPLICATIONS ON A NETWORK

(71) Applicant: Broadcom Corporation, Irvine, CA (US)

(72) Inventors: Philippe Klein, Jerusalem (IL); Jacob Mendel, Kibutz Givat Brenner (IL); Shlomo Markel, Haifa (IL)

(73) Assignee: Broadcom Corporation, Irvine, CA (US)

( * ) Notice: Subject to any disclaimer, the term of this patent is extended or adjusted under 35 U.S.C. 154(b) by 40 days.

(21) Appl. No.: 13/904,426

(22) Filed: May 29, 2013

(65) Prior Publication Data
US 2014/0325594 A1   Oct. 30, 2014

Related U.S. Application Data

(60) Provisional application No. 61/816,430, filed on Apr. 26, 2013.

(51) Int. Cl.
*G06F 7/04* (2006.01)
*H04L 29/06* (2006.01)
*H04W 12/06* (2009.01)
*H04L 29/08* (2006.01)

(52) U.S. Cl.
CPC ............... *H04L 63/08* (2013.01); *H04W 12/06* (2013.01); *H04L 63/105* (2013.01); *H04L 63/107* (2013.01); *H04L 67/34* (2013.01); *H04L 2463/082* (2013.01)

(58) Field of Classification Search
CPC ............................... H04L 63/08; H04W 12/06
USPC ............................................................ 726/2
See application file for complete search history.

(56) References Cited

U.S. PATENT DOCUMENTS 6,075,863 A * 6/2000 Krishnan et al. ............... 713/191
2001/0036273 A1 * 11/2001 Yoshizawa .................... 380/247

(Continued)

OTHER PUBLICATIONS

M2M.World.News, One in Every Five Wearable Wireless Devices Set for Healthcare Deployment by 2017, ABIresearch® 2pp., Jun. 21, 2012.

(Continued)

*Primary Examiner* — Peter Shaw
(74) *Attorney, Agent, or Firm* — Brinks Gilson & Lione (57) ABSTRACT

A secured communication network can include a server including an authentication backend, the authentication backend configured to communicate with an authentication front end of a communication device. A server applet can be associated with the authentication backend. The server applet can authenticate an access right associated with the communication device and establish a security level for the communication with the communication device based on information received from the authentication front end.

17 Claims, 5 Drawing Sheets

(56) References Cited

U.S. PATENT DOCUMENTS

| | | | | |
|---|---|---|---|---|
| 2002/0169874 | A1* | 11/2002 | Batson | H04L 63/08 709/225 |
| 2003/0014363 | A1* | 1/2003 | Sethi | 705/44 |
| 2004/0015958 | A1* | 1/2004 | Veil et al. | 717/174 |
| 2006/0165060 | A1* | 7/2006 | Dua | 370/352 |
| 2007/0190939 | A1* | 8/2007 | Abel | 455/41.2 |
| 2007/0244811 | A1* | 10/2007 | Tumminaro | 705/39 |
| 2007/0264974 | A1* | 11/2007 | Frank et al. | 455/411 |
| 2008/0032738 | A1* | 2/2008 | Boyer et al. | 455/556.1 |
| 2008/0271109 | A1* | 10/2008 | Singh | H04L 63/08 726/1 |
| 2009/0143104 | A1* | 6/2009 | Loh et al. | 455/558 |

OTHER PUBLICATIONS

M2M.World.News, Healthcare Reform to Boost Growth in Telehealth Market by 55 Percent in 2013, IMSresearch Excellence in Market Intelligence, 2pp., Dec. 31, 2012.

Yu-Tzu Chiu, Encryption Chip Fights Off Sneak Attacks, Processor Obscures Characteristics that Enable Side-Channel Attacks in Cloud Computing, 2pp., Mar. 18, 2013.

IntelPR, Intel Labs Tunes into a Wireless Future Where Everything that Computes is Connected, 2pp., Sep. 13, 2012.

Matthew Green, The Threat in the Cloud, pp. 86-89, IEEE, Jan./Feb. 2013.

* cited by examiner

METHODS AND SYSTEMS FOR SECURED AUTHENTICATION OF APPLICATIONS ON A NETWORK

1. PRIORITY CLAIM

This application claims priority to U.S. Provisional Application Ser. No. 61/816,430, filed Apr. 26, 2013, which is incorporated herein by reference in its entirety.

2. TECHNICAL FIELD

This disclosure relates to securing authentication and/or providing a security level for applications executing on a communication network, including securing third-party mobile applications.

3. Background

With the rapid advance of technology, complex electronic devices are in widespread use in virtually every context of day to day life. The electronic devices may often be quite simple, but often have hundreds or thousands of individual electronic elements that are used to implement the device. Software frequently interfaces with the electronic components, allowing a user to use all of the features of the electronic device. The applications executing on a network may need to be securely authenticated.

BRIEF DESCRIPTION OF THE DRAWINGS

The innovation may be better understood with reference to the following drawings and description. In the figures, like reference numerals can designate corresponding parts throughout the different views.

DETAILED DESCRIPTION

The discussion makes reference to methods and systems for securing on-line applications in communication environment. A device of a user can communicate with a server to watch movies, perform banking functions, make payments, purchase security sensitive items, e.g., checks, obtain e-health or hospital records, obtain university records, and obtain employment records, etc. The secure link of the device need not rely on the native encryption and security methods for a given network, e.g., L2 network encryption. Multiple security levels over heterogeneous network technologies can be supported. An end-to-end software-specific security scheme at the application level or transport L3 encryption (IPsec) need not be relied on. Authentication and/or multiple levels of security can be provided depending on a part of the application to be used, a server, a communication device and/or a network connecting the communication device to the server. Improvements in security measures for such devices can help continue to drive the widespread adoption and demand for such devices.

Figure 1:
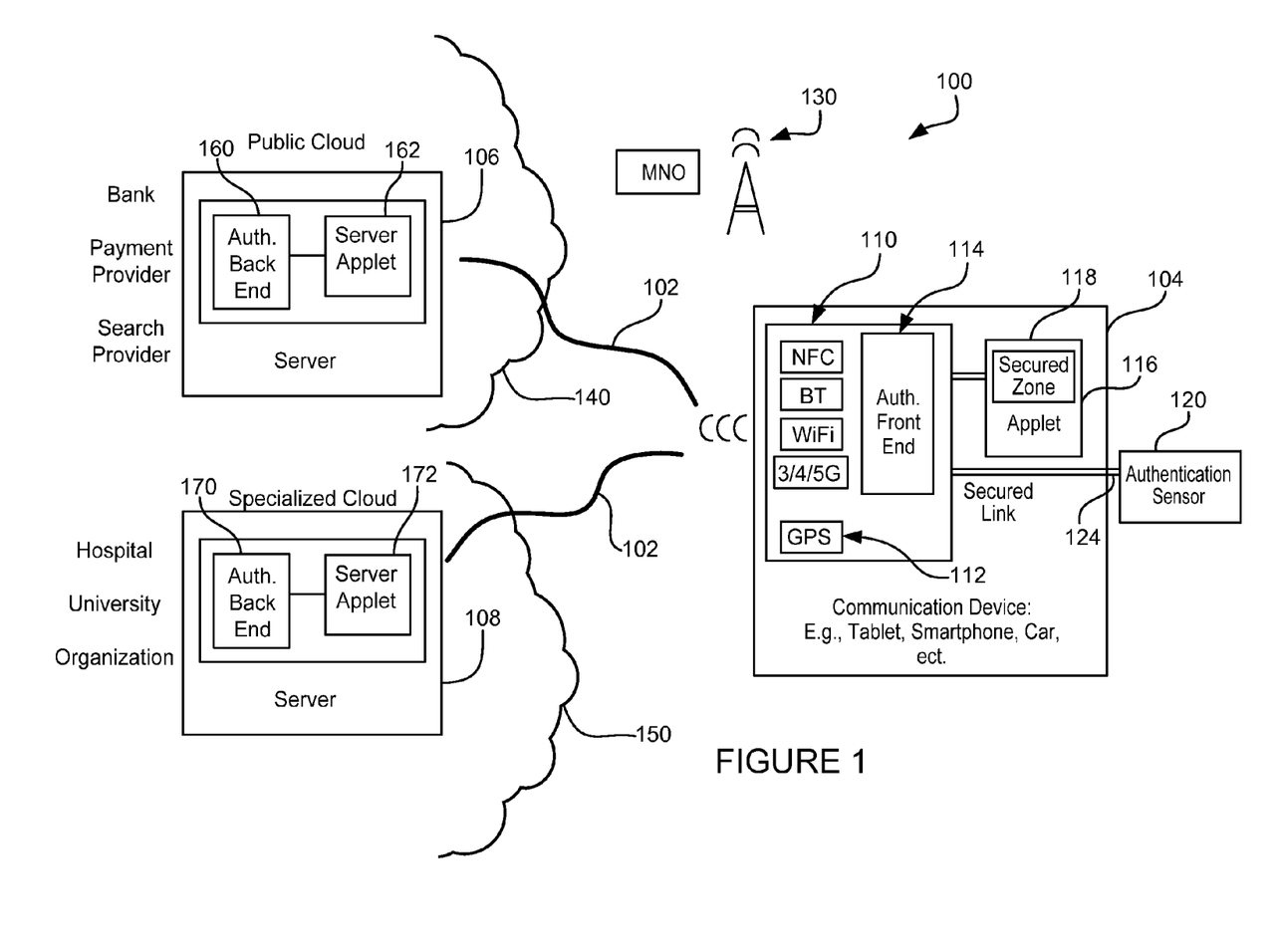
FIG. 1 is a block diagram of an exemplary secure communication environment.

FIG. 1 is a block diagram of an exemplary secure communication environment 100. Communication signals 102 can be sent between endpoints, e.g., a first communication device 104 and a first server 106, a second server 108, etc. The communication device 104 can be a mobile device such as a cell phone, personal digital assistant, tablet, portable email device, smartphone, vehicle and other mobile devices including a portable gaming system. Exemplary vehicles include automobiles, aircraft, ships and spacecraft. In some implementation, the communication device 104 can also be a non-mobile device, e.g., a desktop computer at a work station, a set-top-box at a home, etc.

The communication device 104 can include a transceiver 110 configured to transmit and receive communication messages. The messages can be sent via different protocols, e.g., near field communication (NFC), BLUETOOTH™ (BT), Wireless Fidelity (WiFi), Infrared (IR), and cellular (e.g., 3G, 4G, 5G). The communication device 104 can also include a location device, e.g., a Global Positioning Satellite (GPS) receiver 112. The transceiver is configured to communicate using one or more different protocols and the location device can be implemented on a single integrated circuit or on multiple integrated circuits.

To secure messages sent and received in the communication environment 100, the communication device can also include a processor 114 connected, directly or indirectly, with a memory 116. The processor 114 can execute code, e.g., an applet stored in the memory 116, to implement an authentication front end. The memory 116 can be implemented in various ways, e.g., with a secure element, universal integrated circuit (UICC) or a secure digital (SD) memory. Additionally or alternative, the applet can be implemented using hardware or firmware, e.g., if more security is required than a software only implementation, through a secure microcontroller or other trusted platform module (TPM), trusted execution environment (TEE), hardware and software tokens, etc. In some implementations a combination of both software and hardware can be used.

The processor 114 can also connect to other elements for securing communications, including an authentication sensor or sensors 120 which can be used to collect user information, e.g., biometric information, e.g., face recognition, vein recognition, vital signs and fingerprints, and/or gestures or motion. The user information can be sent with the secured communications, and used to determine authentication and/or a security level to help prevent impersonation. Additionally or alternatively, the sensor 120 can detect environmental conditions including a location of the device of the user, whether the device is located indoors or outdoors, temperature, date, time, etc. The information from the sensors, GPS, etc. is secured by hardware and/or software to protect an integrity of the authentication parameters. For example, if position is one of the criteria, altering or tempering of the location information given by the GPS is detected the hardware and/or software and reported to the communication device 104 as being unreliable location information.

The communication environment 100 can include antennas, landlines, satellites and cellular towers 130 operated by mobile network operators (MNO) to facilitate communication between the communication device 104 and the servers 106, 108. In one example, the communication device 104 can access the first server 106 through a public cloud 140. The first server 106 can be operated by a search provider, e.g., YAHOO or GOOGLE, a payment provider, e.g., PAYPAL, a bank or other financial institution, etc. In another example, the communication device 104 can access a second server 108 through a private or specialized cloud 150. The second server 108 can be operated by various entities including a hospital, university and organizations.

To provide for backend security between the communication device 104 and the first and second servers 106, 108, the first server 106 can include a processor 160 and a memory 162 for storing a server applet, and the second server 108 can include a processor 170 and a memory 172 for storing a server applet. Additionally or alternatively, the applets can be implemented with hardware or firmware. As described in more detail below, the authentication backend processors 160, 170, server applets 162, 172, authentication front end 114, and communication device applet 116 can provide for secured communications that are network agnostic, e.g., public or private networks. Communications can also be secured regardless of the connection currently available, e.g., NFC, BT, IR, Wi-Fi, 3/4/5G, etc., including those provided by some communication devices that implement integrated, multi-network architectures. Network port communication can help prevent tampering.

Figure 2:
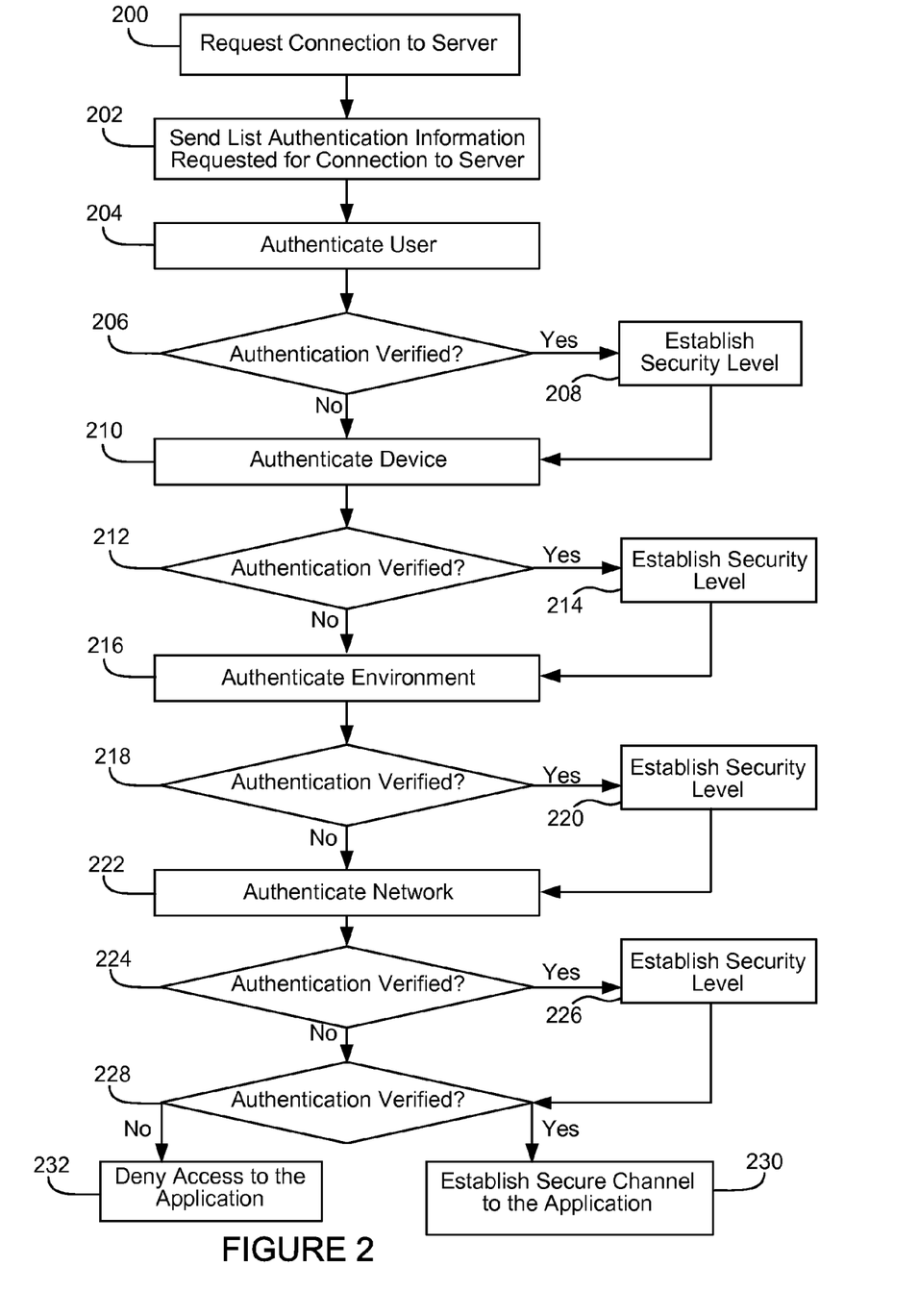
FIG. 2 is a flow chart for establishing exemplary secure communications between a communication device and a server on a network.

FIG. 2 is a flow chart for establishing exemplary secure communications between the communication device 104 and one or more servers, e.g., the first server 106 and the second server 108, on the communication network 100. The secure communication can occur with the first server 106, the second server 108 or both.

The communication device 104 can request a connection to the servers 106, 108. The servers 106, 108 can connect through a network for a given application or sub-application, e.g., the servers 106 can connect to the communication device 104 through the public cloud 140 or/and the servers 108 can connect through a specialized cloud 150 (200). For ease of explanation, a connection with the first server 106 will be described, but a connection to one or more different servers, e.g., the second server 108, can be similarly accomplished.

The server 106 can send to the communication device 104 a list of requested authentication information. The list can be sent via a communication packet by way of the MNO 130 or other communication path (202). The requested information can be used to establish a connection with the application at a determined security level available to the application. Critical functionality and key storage for authenticating the communication device 104 can be stored in hardware, and outputs, inputs and challenge questions can be stored in software in the communication device 104. The elements stored in software can be encrypted to protect the information from being stolen, e.g., the elements can be encrypted with a symmetrical 128 bit or 256 bit advanced encryption standard (AES) or with asymmetrical Rivest Shamir Adleman (RSA) authentication, Triple data encryption standard (3DES), elliptic curve cryptography (ECC), etc., and verified according to the International Organization for Standardization (ISO) 9796 and other standards.

For added security, the memory 116 can include a secure zone 118 to store the security related algorithms, e.g., to prevent hacking. The secure zone 118 can be implemented, for example, with a second operating system or second core processor of the communication device 104, which is physically and/or logically isolated from a first operating system or core processor. The authentication information can be packaged, encrypted and signed to secure the information from being viewed and tampered with by unauthorized entities before being sent to the server 106.

To establish a security level available to the application, the server 106 can authenticate the user (204). For example, the server can process authentication information sent by the communication device 104 in response to the request for information. The authentication backend 160 of the server 106 can determine if the user of the communication device 104 is a verified user based on the processed information (206). Among other information, the server 106 can process a communication user's response to a challenge question to determine if the response matches an expected response to the challenge question. Valid responses can be stored in the server applet 162, e.g., in a secured zone of the server applet 162 of the server 106. Another way that the server 106 can determine an authentication of the device includes comparing a stored biometric template to biometric information of the user sent by the communication device 104. The biometric information of the devices can be obtained from the user, for example, via the authentication sensor 120. The authentication sensor 120 can send the biometric information to a network port of the communication device 104 by way of the secured link 121. If authentication of the user is verified, the server 106 can establish a security level for execution of the application on the communication device 104 (208).

Additionally or alternatively, the authentication back end 160 can authenticate the communication device 104 (210). The communication device 104 can store device verification information in hardware and/or software. If the authentication is not verified, the server 106 can deny access of its system and applications to the communication device 104 (212). If the authentication is verified, the server 106 can establish a security level for the device, e.g., independent of any application specific security (214). A security level of access to the device can be determined based on whether the communication device 104 includes a hardware secure element, e.g., higher security level, software security, e.g., a lower security level, or both, etc.

Additionally or alternatively, the authentication back end 160 can authenticate an environment (216). The environment information can be used to verify authentication of the communication device (218). For example, if the communication device 104 sends information that it is currently located in China when it should be located in the U.S., authentication may be denied. If authentication of the environment is verified, a security level can be established based on the information (220). As one example, if the device is operating a content sharing program like WEBEX, a screen capture feature can be disabled to obtain a higher level of security than if the screen capture feature was on. If the device is used to purchase items on AMAZON while the user is riding on a train, the AMAZON application may not allow access to as high a secure level of features than if the device was located at home. In another example, the server 108 of a company may not allow access to determined documents if the communication device 104 is located outside of the office, or if the user of the communication device 104 is attempting to view documents outside of business hours.

Additionally or alternatively, the authentication back end 160 can authenticate the network (222). Factors can be considered when establishing the physical secure channel, e.g., a policy of the public cloud 140 or the specialized cloud 150 in the case of the server 108. Based on information about the communication device 104 and the network, network authentication can be verified (224). If authentication is verified, the security level can be established (226). In one example, a pacemaker communication device of the user sends heart rate information to a medical provider for data processing and monitoring over a secured network. A physical secure channel can be established according to the security level of the communication device 104.

Based on the above authentications for example, the server 106 can determine if the requested authentication and security levels have been verified (228). For example, an identity of the user of the device, a type of application requested to be accessed at the server 106, a location of the device, a time of day of the access, and a security level of the communication device 104, etc. can be used to determine authentication, a security level or both authentication and a security level. Depending on the authentication and security level the application may access the server a determined amount. Based on the authentication and security level, the communication network 100 can establish a secure channel to the communication device 104 by way of the application (230). If the requested authentication and security level is not verified, the server 106 can deny access to the communication device 104 for the application (232).

Figure 3:
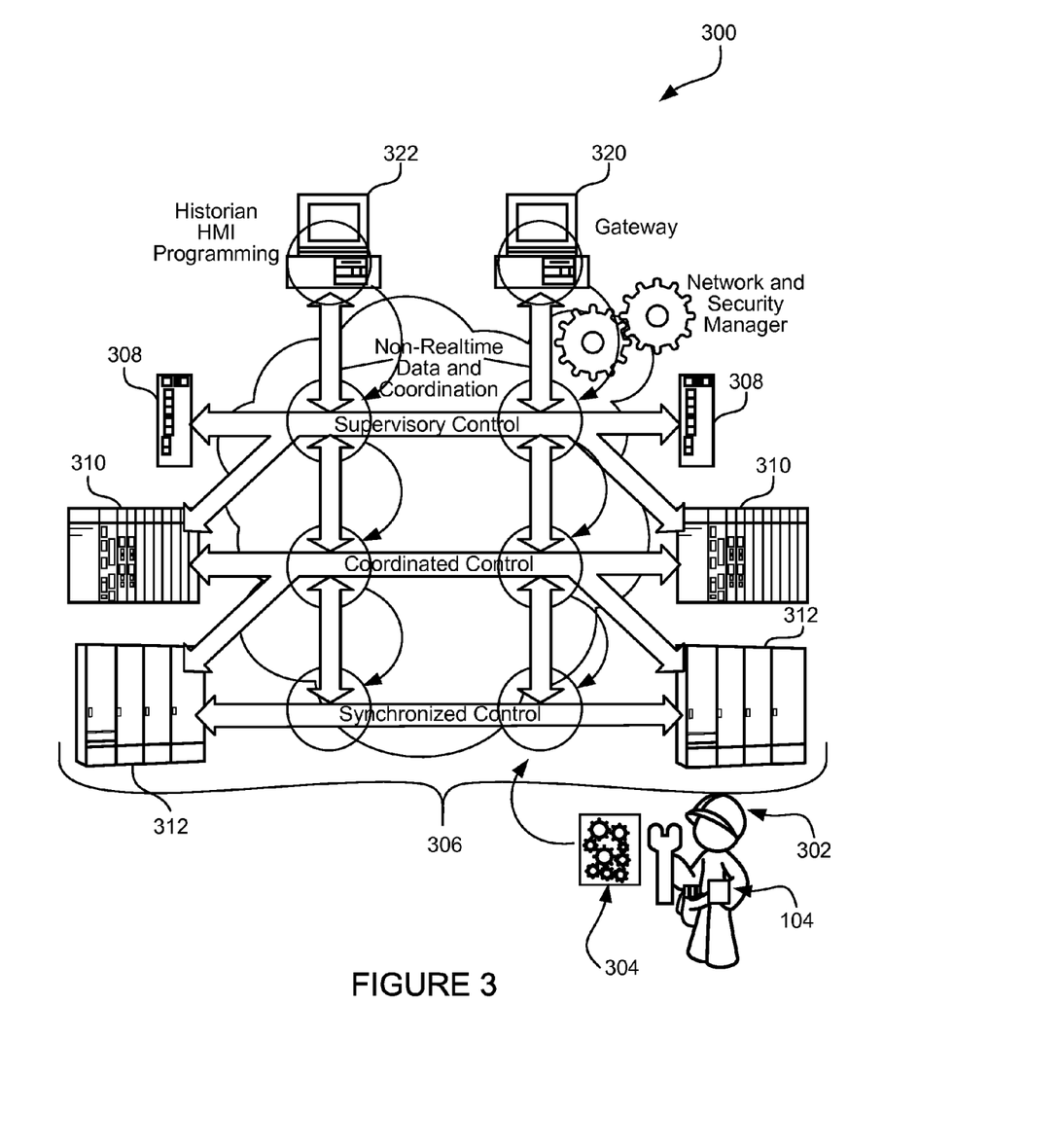
FIG. 3 is a block diagram of an exemplary communication environment for determining a security level of access available to the communication device.

FIG. 3 is a block diagram of an exemplary communication environment 300 for determining a security level of access available to the communication device 104. For example, the user 302 can utilize the communication device 104 to aid them in working on a machine 304. The communication device 104 connects, wirelessly or through wires, directly or indirectly, with server 306 to obtain secured information about the machinery 304. The server 306 can include a converged network on the plant floor, including supervisory control units 308, coordinated control units 310 and synchronized control units 312.

To determine a security level provided to the communication device 104, a location of the communication device 104 can be compared to a location of machinery 304 that the authenticated user is working on. For example, a location of a worker at a nuclear power plant is compared to a location of machinery being worked on when the server 306 is providing information about the machinery, e.g., a maintenance guide. If the communication device 104 is near the machinery, the server 106 can provide a higher level of secure information to the communication device 104 than if the communication device 104 was not near the machinery. For example, whether the server 306 provides access to the supervisory control layer 308 or the synchronized control layer 312 can depend on a security level established for the authenticated user 302 on the authenticated communication device 104 by the location of the communication device 104 to the machinery 304, and/or other factors, e.g., time of day. This provides a vertical access function of the level of security between the gateway computer 320 and the applications of protocols of units 308, 310, 312, and the historian human machine interface (HMI) programming computer 322 and the application and protocols of units 308, 310, 312.

The GPS 112 and/or 3/4/5G 110 can be used to supply location information to the communication device 104 for sending to the server 306 to be used to determine a location of the communication device 104 and compare the location of the communication device 104 to a determined location of the machinery 304. A location of the machinery can be stored, for example, with the server 306, or determined, e.g. by the server 306 communicating with the machinery 304. To allow access to the more secure applications, or the content of documents provided by the application, the communication device 104 may need to be physically located within a determined distance of the machinery, e.g., be located next to the machinery. If the communication device 104 is away from the machinery the server 306 may not provide the guide.

Figure 4:
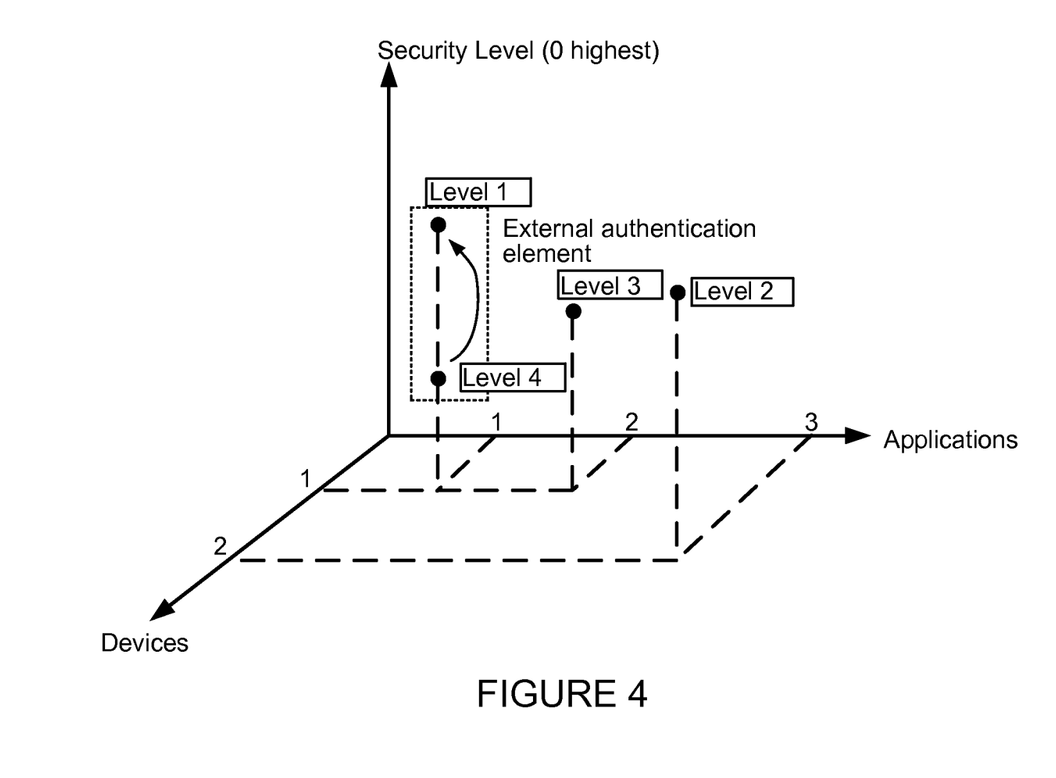
FIG. 4 is a diagram of an exemplary multi-dimensional, single security module.

FIG. 4 is a diagram of an exemplary multi-dimensional, single security module. The single security module can operate on multiple devices (e.g., devices 1, 2) over various applications (e.g., applications 1, 2, 3) for multiple security levels (e.g., levels 0, 1, 2, 3, 4). In view of the single security module approach, one or more databases that contain huge amounts of credentials to address every application and every device separately are not needed.

In one example, for device 1, application 1, an application security level can move from a lower level 4 to a higher level 1, e.g., based on external authentication elements, e.g., provided by the communication device 104 or the user. For example, the user may have provided biometric information to the communication device 104 to obtain the higher security level with the application. Or the communication device 104 may have been moved physically closer to the office or machinery that the user is working on.

For the same device 1, the communication device 104 can, separately or concurrently to the level 1 access of application 1, have level 3 access to application 2. Therefore, the same communication device 104 of the same user can provide different levels of access to different applications. The level of security can be based on various factors, e.g., a location of the communication device 104, a time of day, an identification of the communication device 104, the type of security in the communication device 104 that the user is utilizing, etc.

For a different communication device 104, such as one that includes hardware security, the security level may be higher. Additionally or alternatively, if the communication device 104 is using 3/4/5G to communicate, instead of BT, the security level may change. Also, for a different device 2 accessing an application 3, the security level may be determined at level 2 under the present circumstances including any of the factors described herein, or other factors. In this way, the security module can provide various devices different security levels of access over various applications. User privacy and private information can be maintained in an open/cloud environment, secured and flexible payment methods can be provided, and e-health services in hospitals and private access to medical records can be accomplished, without the need for separate, closed applications for each type of activity.

Figure 5:
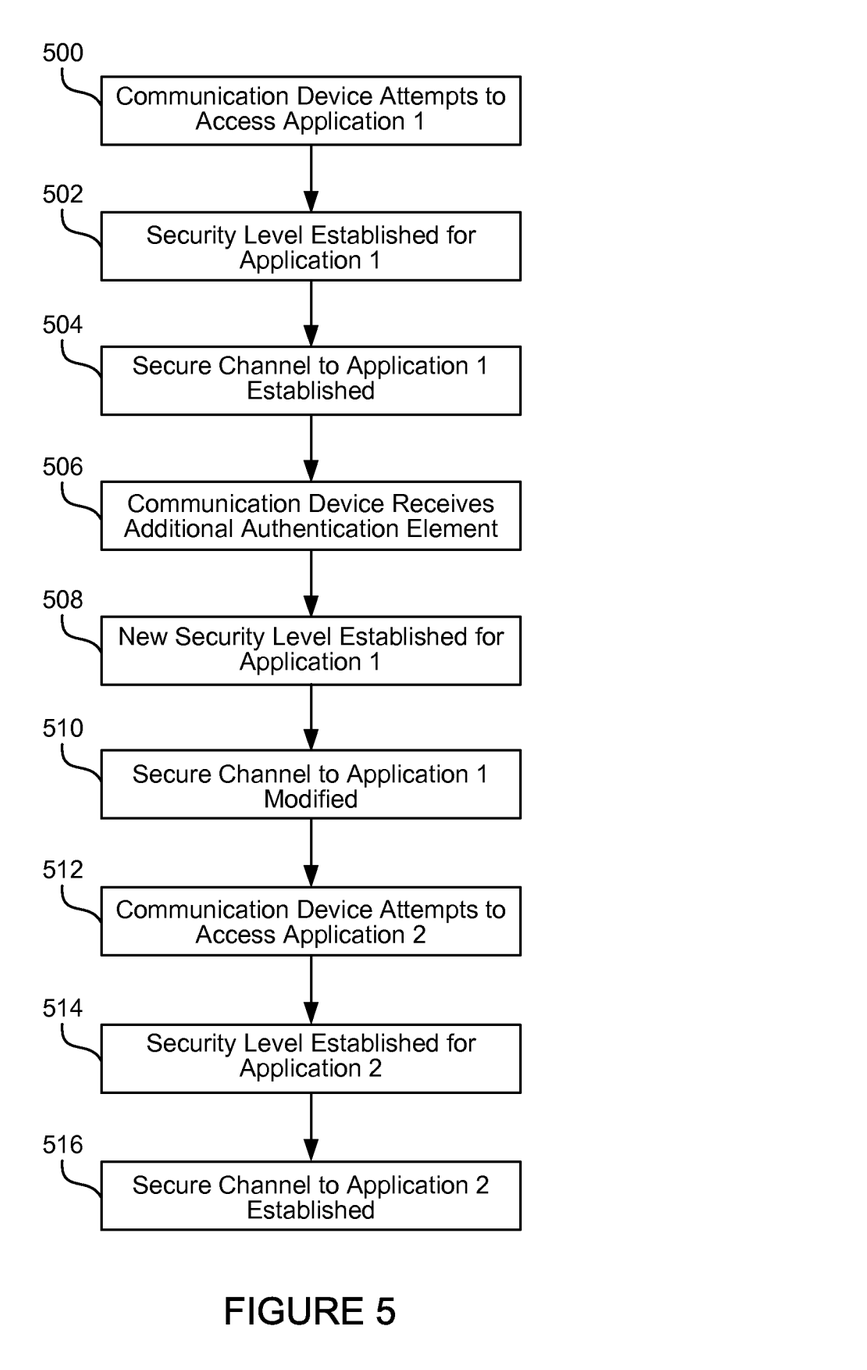
FIG. 5 is a flowchart example of establishing secure communication of applications executing on the communication device.

FIG. 5 is a flowchart example of establishing secure communication of applications executing on the communication device 104. The communication device 104 accesses application 1, e.g., of FIG. 4 (500). The communication device 104 may execute application 1 in response to a user clicking an icon on the user the communication device 104. For example, application 1 may provide a connection to a server at the user's place of work e.g., the first server 106 or the second server 108, on the communication network 100. In this example, Application 1 is an open application that the user purchased through an app store. Application 1 can be saved on the communication device 104, saved on a network, e.g., the cloud, or partially saved on both the communication device 104 and the network. The user is a passenger in a vehicle on the way to work and the communication device is currently located a determined distance from work, e.g., 5 miles.

A low security level is initially established for Application 1 (502). A low security level can be established based on information from the communication device 104, e.g., a location of the communication device 104 and an identity of the user, etc. A policy of the server being accessed by the communication device 104 via Application 1 can state that for this particular user located a determined distance from work, security level 4 is appropriate. A secure channel between the server and Application 1 may also be established based on the security level (504).

When the communication device 104 receives additional authentication information, the security level can be changed, e.g., raised or lowered (506). In one example, when the communication device arrives within a determined distance from work, e.g., 500 feet, a new security level is established for Application 1. For example, for this user at work a security level of 1 can be determined, providing the application the highest level of access to the work server and/or the highest level of access to the application. The communication environment can establish a modified secure channel between Application 1 and the work server.

While Application 1 is connected to work, the user of the communication device 104 may open Application 2, e.g., a third-party application from which the user can access her bank (512). Alternatively, a first party application may be used. In one scenario, it is 9:00 AM local time for the bank and the communication device 104 on a weekday, and the user decides not to provide a thumb print to the communication device 104. Based on this information, and possibly other information, Application 2 is granted a determined level of access to the bank (514). If level 3 access is granted, for example, the communication environment establishes a secure channel based on the level 3 security level (516). At level 3 the application may access general information from the bank, but specific account information is not accessible, for example. Therefore, the communication environment can provide multiple applications, various security levels for the same or different communication devices.

The methods, devices, techniques, and logic described above may be implemented in many different ways in many different combinations of hardware, software or firmware or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits interconnected through trusted links. All or part of the logic described above may be implemented as instructions for execution by a processor, controller, or other processing device and may be stored in a tangible or non-transitory machine-readable or computer-readable medium such as flash memory (FLASH), random access memory (RAM) or read only memory (ROM), programmable read only memory (PROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, many more embodiments and implementations are possible. Accordingly, the description is not to be restricted.

What is claimed is:

1. A secured communication network, comprising:
    a server including an authentication backend, the authentication backend configured to communicate with an authentication front end of a communication device; and
    a server applet associated with the authentication backend, where the server applet authenticates an access right associated with the communication device and establishes a security level for the communication with the communication device based on comparison of a location of the communication device to location information of a target device associated with the access right, the location of the communication device received from the authentication front end;
    where the server applet establishes the security level as a different security level based on an external authentication element received from the communication device, wherein the external authentication element comprises at least one of a new location of the communication device with respect to the location information of the target device associated with the access right, or biometric information of a user of the communication device.

2. The secured communication network of claim 1, where the communication comprises communication through a network port.

3. The secured communication network of claim 1, where communication device comprises a mobile device.

4. The secured communication network of claim 1, where the security level is based on a current communication protocol of the communication device.

5. The secured communication network of claim 4, where the communication protocol comprises at least one of near field communication, BLUETOOTH™, Wireless Fidelity, or cellular, and the established security level changes to the different security level in accordance with the respective communication protocol.

6. The secured communication network of claim 1, where the external authentication element comprises environmental information.

7. The secured communication network of claim 1, where the server applet is configured with hardware.

8. The secured communication network of claim 1, wherein the server applet establishes concurrently the security level for an application and the different security level for a different application, respectively.

9. The secured communication network of claim 1, wherein the server applet changes the security level for an application to the different security level for the application based on the external authentication element received from the communication device.

10. The secured communication network of claim 1, wherein the information received from the authentication front end to authenticate the access right includes environment information of an application executed on the communication device.

11. A method for securing a communication network, comprising:
    receiving a request from a communication device to connect to a server;
    authenticating a user of the communication device;
    establishing a security level for the communication device if the user is authenticated;
        where the security level is established based on comparison of a location of the communication device to location information of a target device, the location of the communication device received from the authentication front end;

receiving an external authentication element from the communication device after establishment of the security level, the external authentication element comprising at least one of biometric information of the user of the communication device or environment information, the environment information indicative of a new relative location of the communication device with respect to the location information of the target device; and changing the security level to a different security level in response to receipt of the external authentication element.

12. The method of claim 11, where the security level is determined based on a location of the communication device, and the external authentication element comprises another location of the communication device.

13. The method of claim 12, where the request to connect to the server is received through a network port.

14. The method of claim 11, where the security level is based on a current communication means of the communication device.

15. A communication device, comprising:
a network port;
an applet to provide a secured connection with a communication network through the network port; and
an authentication front end connected with the applet, the authentication front end to send a location of the communication device to an authentication backend of a server for comparison with location information of a target device, the comparison to establish a first security level for the secured connection with the server over the communication network, and the authentication front end to subsequently send an external authentication to the authentication backend of the server to change the established first security level to a second security level for the secured connection with the server over the communication network, the second security level being different from the first security level, and the external authentication element being at least one of biometric information of a user of the communication device or a new location of the communication device with respect to the location information of the target device.

16. The communication device of claim 15, where the information comprises a location of a user of the communication device, and the external authentication comprises the biometric information of the user.

17. The communication device of claim 15, further including a secured zone of the applet, the secured zone comprising hardware.

* * * * *